United States Patent [19]
Ichikawa

[11] Patent Number: 5,948,082
[45] Date of Patent: Sep. 7, 1999

[54] COMPUTER SYSTEM HAVING A DATA BUFFERING SYSTEM WHICH INCLUDES A MAIN RING BUFFER COMPRISED OF A PLURALITY OF SUB-RING BUFFERS CONNECTED IN A RING

[75] Inventor: Osamu Ichikawa, Ebina, Japan

[73] Assignee: International Business Machines Corporation, Armonk, N.Y.

[21] Appl. No.: 08/899,375

[22] Filed: Jul. 23, 1997

[30] Foreign Application Priority Data

Sep. 2, 1996 [JP] Japan .................................. 8-231601

[51] Int. Cl.⁶ .............................. G06F 12/08; G11C 8/04
[52] U.S. Cl. .............................. 710/52; 710/56; 711/109; 711/110; 711/117
[58] Field of Search ........................... 395/872; 711/110, 711/117, 109; 710/52, 56

[56] References Cited

U.S. PATENT DOCUMENTS

| | | | |
|---|---|---|---|
| 3,766,534 | 10/1973 | Beauseleil et al. | 340/172.5 |
| 4,507,760 | 3/1985 | Fraser | 365/221 |
| 4,803,654 | 2/1989 | Rasberry et al. | 364/900 |
| 4,839,866 | 6/1989 | Ward et al. | 365/221 |
| 4,875,190 | 10/1989 | Sakano | 365/189.04 |
| 5,043,981 | 8/1991 | Firoozmand et al. | 370/85.1 |
| 5,519,701 | 5/1996 | Colmant et al. | 370/60.1 |

OTHER PUBLICATIONS

IBM Technical Information Bulletin, vol. 24 No. 11A pp. 5716–5723, Terrill et al.: "Random–access Memory Beamformer", Nov. 1981.

IBM Technical Information Bulletin, vol. 23 No. 11 pp. 5033–5039, Terrill et al.: "Random–access Memory Implementation of a Beamformer", Apr. 1981.

IBM Technical Information Bulletin, vol. 20 No. 8 pp. 3309–3310, Chapman et al.: "Data Management in a Circular Buffer", Jan. 1978.

*Primary Examiner*—Thomas C. Lee
*Assistant Examiner*—Albert Wang
*Attorney, Agent, or Firm*—Anthony N. Magistrale

[57] ABSTRACT

Disclosed is a computer system having a ring buffer arrangement which includes a plurality of sub-rings and a main ring. Each of the sub-rings includes a plurality of buffer memories and the main ring includes a plurality of the sub-rings. A main write pointer and a main read pointer are provided for the main ring in order to indicate a sub-ring for which data writing and data reading are currently being performed respectively. A sub-write pointer and a sub-read pointer are provided for each sub-ring in order to indicate, for the sub-ring, a buffer memory for which data writing and data reading are currently being executed respectively. Since the total size of the double ring buffer is large, not all of the buffer memories can be resident in physical memory. However, since the number of buffer memories included in a single sub-ring is relatively small, one sub-ring can be resident in the physical memory. When writing to, and reading from, the buffer synchronously, data buffering is performed by only using one sub-ring to avoid swapping the buffer memories.

16 Claims, 9 Drawing Sheets

COMPUTER SYSTEM HAVING A DATA BUFFERING SYSTEM WHICH INCLUDES A MAIN RING BUFFER COMPRISED OF A PLURALITY OF SUB-RING BUFFERS CONNECTED IN A RING

BACKGROUND OF THE INVENTION

The present invention relates generally to computer systems and more particularly to a computer system which includes a double ring data buffer comprised of a plurality of sub-rings and a main ring.

DESCRIPTION OF RELATED ART

In accordance with recent developments, various types of personal computers (PCS), such as desktop and notebook computers, have been manufactured and are being widely used. The fields in which PCS are being applied are continuing to expand. For example, when a communication adapter card is inserted into a PC and the PC is connected to a communication medium, the PC can be used as an information communication apparatus. When a Data Channel Decoder (DCD) adapter card is inserted into a PC, the PC can serve as a satellite data broadcast reception system for the reception of satellite data broadcasting.

FIG. 1 is a schematic diagram illustrating the conditions when satellite data is fetched as a file by a PC. The satellite data is transferred in the form of packets having, for example, lengths of 288 bits. (More specifically, in addition to 23 bytes that constitute the data contents, a packet includes a check bit. The same conditions apply hereinafter). Packets that are received by a DCD adapter are sequentially accumulated in a 32 kilobyte (K) data buffer provided for a DCD adapter device driver. An application programming interface (API), which is provided within an operating system (OS), assembles packet data accumulated in a data buffer into a group, and saves the data group as a file on a hard disk. A "data group" is a set of meaningful data, and corresponds, for example, to one frame of a picture image. The makeup of a data group is based on the intent and taste of the person who prepares the original data, and the size of a data group and a packet count are variable. It is not uncommon for the largest data group that includes picture images to be 16 megabytes (M).

The grouping of data and the saving of a file may be directly performed by an application program, e.g., "satellite data broadcasting reception application", without going through the API. A packet length of 23 bytes and a buffer memory size of 32K are merely design choices based on current customary communication techniques.

In most cases, the process for writing received data in a data buffer and the process for reading the data from the data buffer and grouping the data are performed synchronously. So long as the writing process and the reading process are performed synchronously, the data buffer can just be a "ping-pong buffer" (see FIG. 2(a)). A ping-pong buffer is constituted by two buffer memories; while one buffer is used for data reading, the other is used for data writing. A ping-pong buffer is useful in that both the buffer memories are used frequently and swapping seldom occurs.

However, the writing process and the reading process relative to the data buffer are not always performed synchronously. Saving a file to a hard disk takes relatively longer than effecting a memory access, and as a result, data reading can be delayed and the processes performed asynchronously. The ping-pong buffer can not absorb the difference between the speeds of the writing process and the reading process. So, if the data writing process is placed on hold, incoming data may be lost. And if successive data is written upon receipt, even though the reading of currently available data has not been completed, data that was received before the reading process was begun will be lost.

It is preferable that a so-called "ring buffer" be employed for buffering received data. A "ring buffer" is a buffering system that provides for the respective buffer memories to be controlled by using a pointer, with the head of the buffer and the end of the buffer being linked together. Data is written beginning at an upper limit address, and when data is written at the lower limit address, the address jumps to the upper address for sequential data writing. FIG. 2(b) is a schematic diagram showing the condition where received data is temporarily held in a single ring buffer. Conceptually, a plurality of buffer memories are arranged in a ring shape to form a ring buffer, with a data read pointer pursuing a write pointer.

The API reads packet data, which is received by the DCD adapter, in units of 32K at a frequency of two to five times per second, and writes the data into a buffer memory pointed to by the write pointer. The API also extracts received data from a buffer memory designated by a read pointer, assembles the data in a data group buffer, and saves the data as a file on a hard disk. The size of a data group is generally not consistent, and a reading operation is delayed when a huge data group is being processed.

Although the thus arranged single ring buffer can absorb a difference between the speeds of the reading operation and the writing operation, there are several disadvantages.

The capacity of a ring buffer must be large enough to permit it to cope with delays in the reading of data from an input buffer. It takes approximately one minute to save a generated data group file having a maximum 16M size on a hard disk. During the file saving process, the generation of data groups, i.e., the reading of data from a buffer, halts. The amount of data to be transferred across an electric wave for one minute is about 8M. Thus, a ring buffer of 8M, i.e., 256 buffer memories of 32K each, must be provided in order to ensure the receipt of data during the longest period for which data reading halts.

It is, however, almost impossible for a ring buffer of 8M to be resident in the physical memory available in a PC. While taking into account the facts that physical memory must be assigned for purposes other than employment as a ring buffer (16M are required as a buffer for data group generation), and that the memory size mounted as a standard in a common PC is at most 16M or 32M, it is obvious that the available physical memory in a PC employed as a satellite data broadcasting reception system is insufficient.

As a result of the insufficient supply of physical memory, the transfer of unused (or old) data to a hard disk, i.e., swapping, is performed. More specifically, only one part of the buffer memories in a ring buffer can be resident in the physical memory, and the remaining buffer memories can not help being transferred to a hard disk (see FIG. 3).

The LRU (Least Recently Used) method, i.e., the theory that covers the swapping of data which has not been used recently, is applied to determine which data is to be swapped out. While referring to FIG. 3, an explanation will be given for an example where the LRU method is applied for a huge ring buffer, e.g., an 8M ring buffer having 256 buffer memories of 32K each. In FIG. 3, the shaded portion is a buffer memory area wherein unprocessed data, i.e., data that has not yet been grouped, is written, and the portion enclosed by a broken line is a buffer memory area that is present in physical memory.

In the ring buffer, buffer memories are employed in order along the ring. The oldest buffer memory, the memory that has been used the longest, is the buffer memory that is used for writing the next data, and it is highly probable that the swapping out of data from this memory has been completed. In order to locate in the physical memory the buffer memory designated by a write pointer, corresponding buffer memory data must be swapped in. In other words, each time a buffer memory is advanced around the ring, swapping occurs. The swapped-in data is invalid data, because it has already been grouped. Generally, memory space is managed by a memory manager that is a part of OS sub-systems. Since the memory manager manages the swapping operation regardless of the API, and can not understand which buffer memory was already grouped, the memory manager can not prevent the swapping of invalid data. Unwanted data swapping imposes extra stress on a system.

Seldom does a data group comprise the maximum 16M, and normally, received data can be processed synchronously by using the several buffer memories that reside in the physical memory. But with a huge ring buffer, each time the received data is written, buffer memories to be used will be sequentially shifted around the ring, and swapping will occur. The efficiency involved in the employment of the buffer memories is accordingly lowered. However, taking into account the data security that must be maintained during the processing of the largest data group, increasing the size of the ring buffer can not be avoided.

The swapping in which hard disk access is involved, imposes a great overhead on a system. The above explanation has been given for a system having one DCD adapter port. When four DCD adapter ports are provided, the opportunities for swapping are increased almost four times. As a result, the swapping would be normalized, and delays in the processing of received data and the loss of received data may be caused.

OBJECTS OF THE INVENTION

To resolve the above described shortcomings, it is one object of the present invention to provide a data buffering system to keep data that is received by a computer system from external sources before the computer system saves the received data as a file.

It is another object of the present invention to provide a data buffering system that is employed for temporarily keeping received data, and that provides for buffer memories to be formed into a ring buffer in order to absorb a gap between a data writing speed and a data reading speed.

It is an additional object of the present invention to provide a data buffering system that has a ring buffer structure for temporally keeping an enormous amount of received data, and that can resolve the problem of the data swapping to a hard disk that is accompanied by a large increase in the size of a ring buffer.

SUMMARY OF THE INVENTION

The present invention is directed to a computer system which includes a ring buffer arrangement in order to absorb a difference between the speed at which data is written to a buffer and the speed at which data is read from a buffer. This ring buffer is constituted by "sub-rings," each of which is a ring of buffer memories that together compose a minimum unit for a buffer ring, and a "main ring" that is a ring composed of the sub-rings. In other words, the data buffering system according to the present invention forms a double ring structure (hereinafter referred to as a "double ring buffer").

A pair of pointers comprising a main write pointer and a main read pointer are provided for the main ring in order to indicate a sub-ring for which data writing is currently executed, and a sub-ring for which data reading is currently being performed. A pair of pointers comprising a sub-write pointer and a sub-read pointer are provided for each sub-ring in order to indicate, for the sub-ring, a buffer memory for which data writing is currently executed, and a buffer memory for which data reading is currently executed. In other words, each buffer memory can be addressed by using a main pointer and a sub-pointer.

Since the double ring buffer is designed based on a presumption that an enormous quantity of data will be received and the writing to the buffer and the reading from the buffer will mostly be performed asynchronously, the total size (the total of the buffer memories) of the buffer is huge. Therefore, not all of the buffer memories in the double ring buffer can be resident in physical memory. But since the number of buffer memories included in a single sub-ring is relatively small, one sub-ring can be placed in the physical memory.

While the writing to and the reading from the buffer are being performed synchronously, only a few buffer memories are employed, and the distance between the write pointer and the read pointer is short. And for the synchronous data processing, data buffering is performed by using only one sub-ring to avoid the swapping of buffer memories.

When the writing to the buffer and the reading from the buffer are performed asynchronously, an increased number of buffer memories is employed and the distance between the write pointer and the read pointer is longer. Therefore, data buffering would be performed by using two or more sub-rings. As a result of the employment of a plurality of sub-rings, swapping must be performed for at least one part of the buffer memories.

The data buffering system of the present invention is especially preferably applied when the data processing is rarely performed asynchronously. Since during synchronous data processing, data buffering is performed by using only one sub-ring, the buffer memories are efficiently used and swapping can be avoided. Only when data processing is delayed and becomes asynchronous is data buffering performed by using a plurality of sub-rings. Since the data buffering system of the present invention minimizes the use of the entire main ring, normalization of the swapping can be prevented.

Other objects, features and advantages of the present invention will become apparent in due course during the detailed description of the embodiments of the present invention, which will be given while referring to the accompanying drawings.

DETAILED DESCRIPTION OF THE INVENTION

Figure 1:
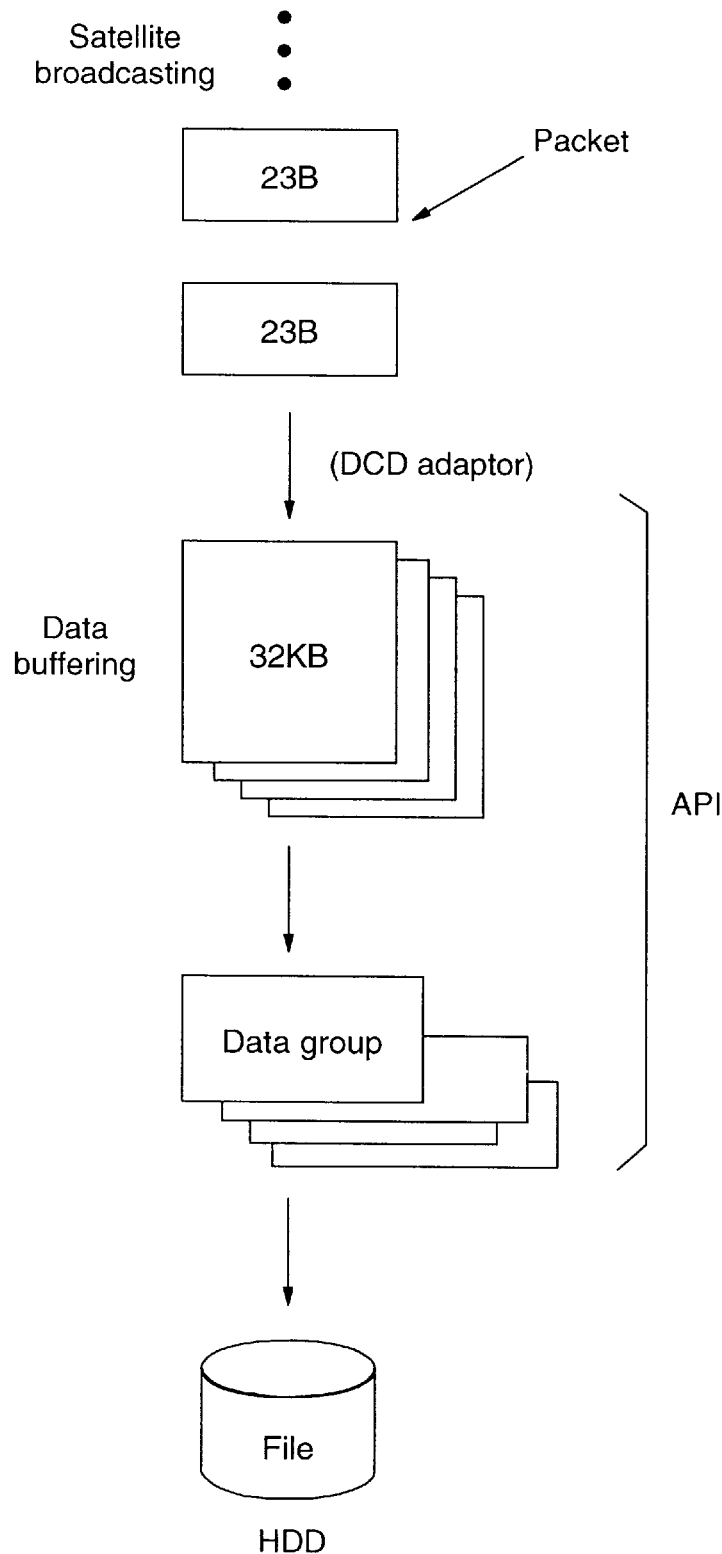
FIG. 1 is a conventional schematic diagram illustrating a condition where a personal computer fetches analog satellite data as a file.
Figure 2A:
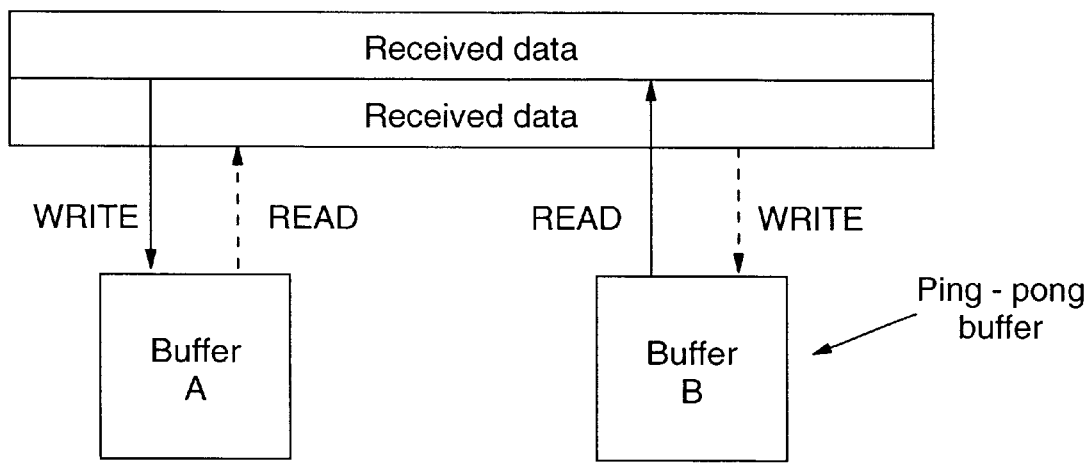
FIG. 2 is a conventional schematic diagram illustrating the structures of a ping-pong buffer and a ring buffer.
Figure 2B:
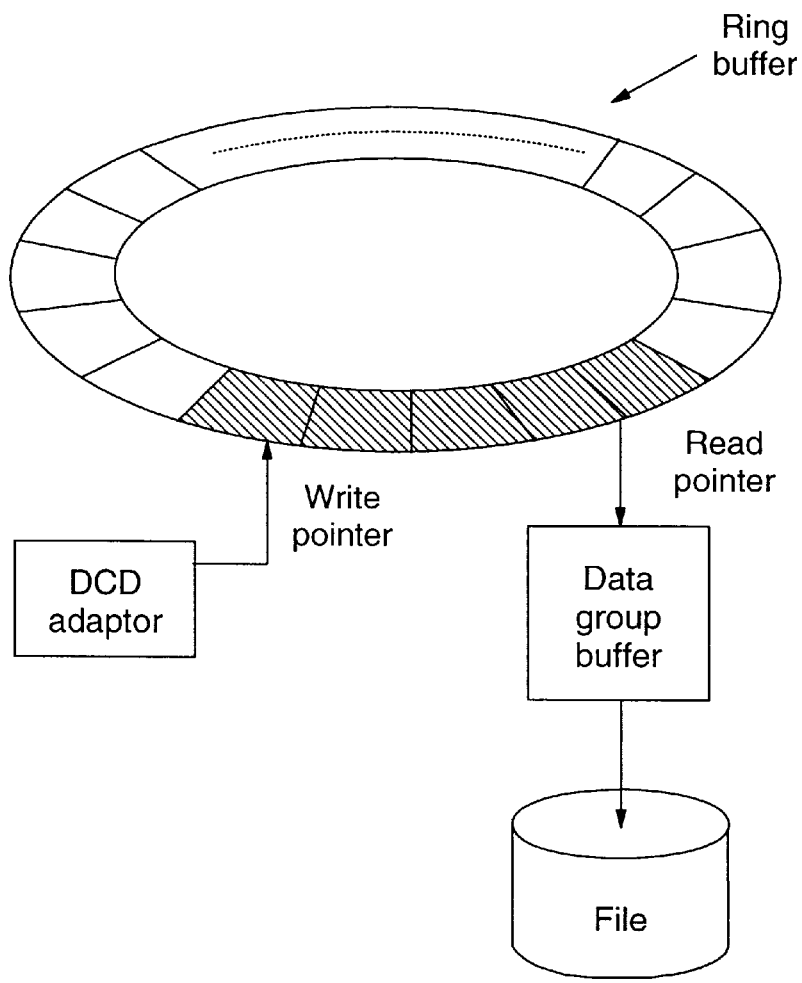
Figure 3:
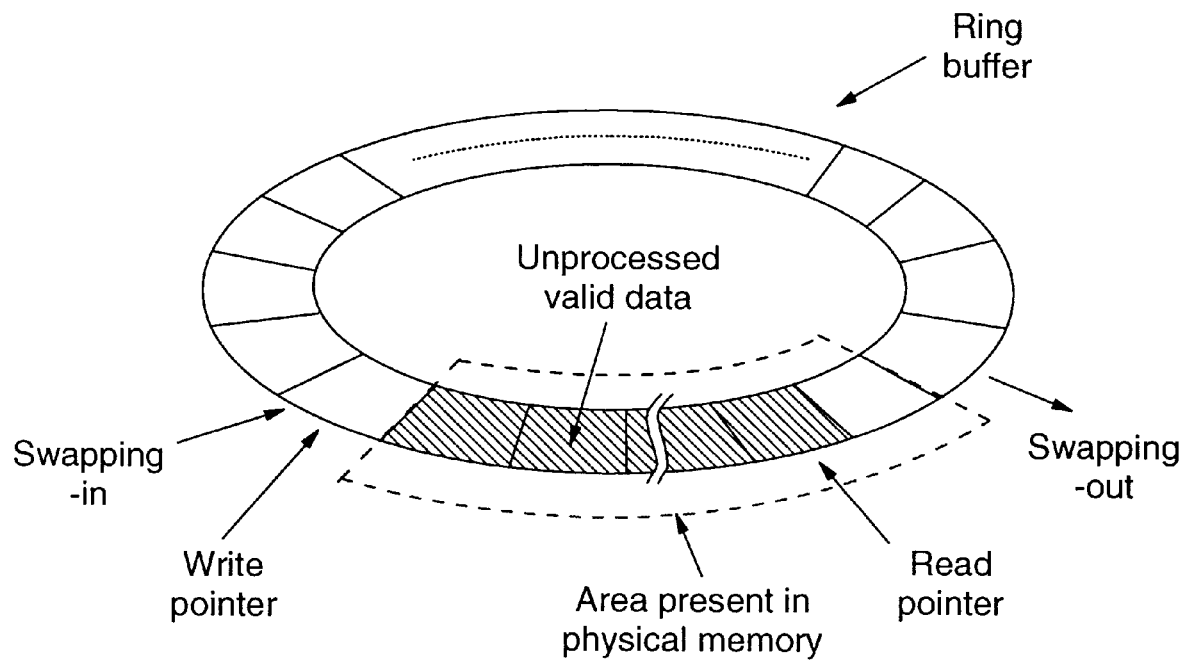
FIG. 3 is a conventional schematic diagram illustrating the condition where buffer memories in the ring buffer are swapped.
Figure 4:
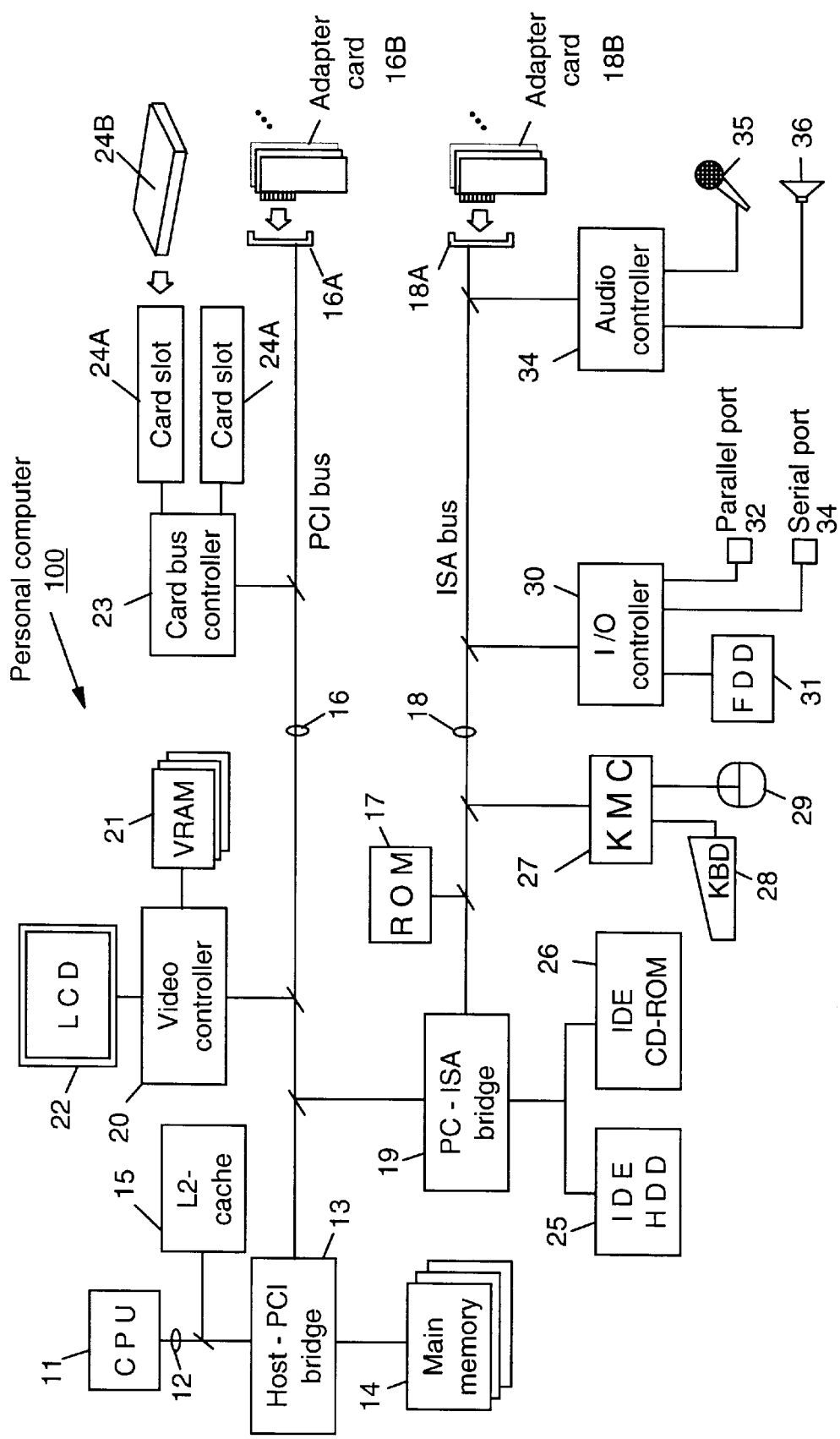
FIG. 4 is a schematic diagram illustrating the hardware arrangement of a personal computer (PC) 100 according to the present invention.

FIG. 4 is a diagram illustrating the hardware arrangement of a personal computer (PC) 100 that is appropriate for carrying out the present invention. A central processing unit (CPU) 11 executes various programs under the control of an operating system (OS). The CPU 11 may be, for example, a Pentium processor from Intel Corp. ("Pentium" is a trademark of Intel Corp.). It is preferable that the OS be the one providing a multitasking environment, such as "OS/2," from IBM Corp. ("OS/2" is a trademark of IBM Corp.), or "Windows 95," from Microsoft Corp. ("Windows" is a trademark of Microsoft Corp.).

The CPU 11 is mutually connected with peripheral devices, which will be described later, via three buses: a processor bus 12 that is directly connected to an external pin of the CPU 11, a Peripheral Component Interconnect (PCI) bus 16 serving as a local bus, and an Industry Standard Architecture (ISA) bus 18.

The processor bus 12 communicates with the PCI bus 16 via a bridge circuit (host-PCI bridge) 13. The bridge circuit 13 in this embodiment includes a memory controller for controlling access to a main memory 14, and a data buffer for absorbing a difference between the speeds of the buses 12 and 16.

The main memory 14 is used as an area into which programs are loaded and as a work area for a currently executing program, and is generally constituted by dynamic RAM (DRAM) chips. The main memory 14 of 16M, for example, is mounted as a standard feature and can be expanded to 128M. An L2-cache 15 is a high-speed memory for absorbing the time for accessing the main memory 14, and is generally constituted by an static RAM (SRAM) chip. The capacity of the L2-cache 15 is, for example, 256K. A ROM 17 is a nonvolatile memory in which is permanently stored a test program (e.g., Power On Self Test (POST)) executed when the system is powered on. The management of memory space is performed by a "memory manager," which is one of the sub-systems of an OS.

The PCI bus 16 is a bus (with a bus width of 32 bits, an operating frequency of 33 MHz, and a highest data transfer speed of 132 Kps) that enables high-speed data transfer. The peripheral devices, such as the video controller 20 and a card bus controller 23, that are driven at a relatively high speed are connected to the PCI bus 16.

The video controller 20 is a dedicated controller for the actual processing of drawing commands issued by the CPU 11. The video controller 20 temporarily stores processed drawing data in a screen buffer (VRAM) 21, and reads it from the VRAM 21 and outputs it to a liquid crystal display (LCD) 22 or to a CRT display (not shown).

The card bus controller 23 is a dedicated controller for outputting bus signals across the PCI bus 16 to PC card slots 24A. A PC card 24B, which conforms to the standards (e.g., "PC Card Specification 95") specified by Personal Computer Memory Card International Association (PCMCIA)/Japan Electronic Industry Development Association (JEIDA), can be inserted into one of the card slots 24A.

The PCI bus 16 and the ISA bus 18 are mutually connected by a bridge circuit (PCI-ISA bridge) 19. The bridge circuit 19 in this embodiment includes a direct memory access (DMA) controller, a programmable interrupt controller (PIC), and a programmable interval timer (PIT).

The bridge circuit 19 in this embodiment also has an Integrated Drive Electronics (IDE) connector for connecting an external IDE storage device. An IDE hard disk drive (HDD) 25 and an IDE CD-ROM drive 26 can be connected to the IDE connector. Accessing a file on the hard disk 25 or the CD-ROM 26 is performed by a "file manager," which is one of the sub-systems of the OS.

The bridge circuits 13 and 19 are specified by the PCI, and are generally provided in the form of a single chip set. An example chip set is "Triton" sold by Intel Corp.

The ISA bus 18 (with a 16-bit bus width and a highest data transfer speed of 4 Mps) has a slower data transfer speed than the PCI bus 16 and is used for the connection of peripheral devices, such as a keyboard/mouse controller (KMC) 27, an I/O controller 30, and an audio controller 34, that are driven at a relatively low speed.

The keyboard/mouse controller 27 is a dedicated controller that fetches, as computer data, code input at a keyboard 28 and coordinate values input via a mouse 29.

The I/O controller 30 is a peripheral controller for driving a floppy disk drive (FDD) 31 and for controlling the exchange of parallel or serial data with an external device, e.g., a printer or a modem (not shown).

The audio controller 34 is a dedicated controller for inputting/outputting an audio signal. The audio controller 34 fetches as computer data audio signals from a microphone 35, or performs digital-to-analog (DA) conversion of audio data and outputs the results through a loudspeaker 36.

At least one bus slot 16A/18A is provided on one end of the bus 16 or 18. A PCI adapter card 16B and an ISA adapter card 18B can be inserted into the bus slots 16A and 18A, respectively. The adapter cards 16B and 18B can be operated by using device drivers for the cards.

An example adapter card is a Data Channel Decoder (DCD) adapter card. The DCD adapter card receives satellite data in a packet form, and performs analog-to-digital (AD) conversion, decoding, or error correction for the received data. The computer system into which the adapter card is inserted can operate the adapter card using a "DCD adapter device driver," and serves as a satellite data broadcast reception system.

Many electric circuits, etc., other than those shown in FIG. 4, are required to constitute the computer system. Since these components are well known to one having ordinary skill in the art, they are not essential to the subject of the present invention. No explanation for them is given in the specification in order to avoid the inclusion of complicated drawings and to simplify the explanation.

Figure 5:
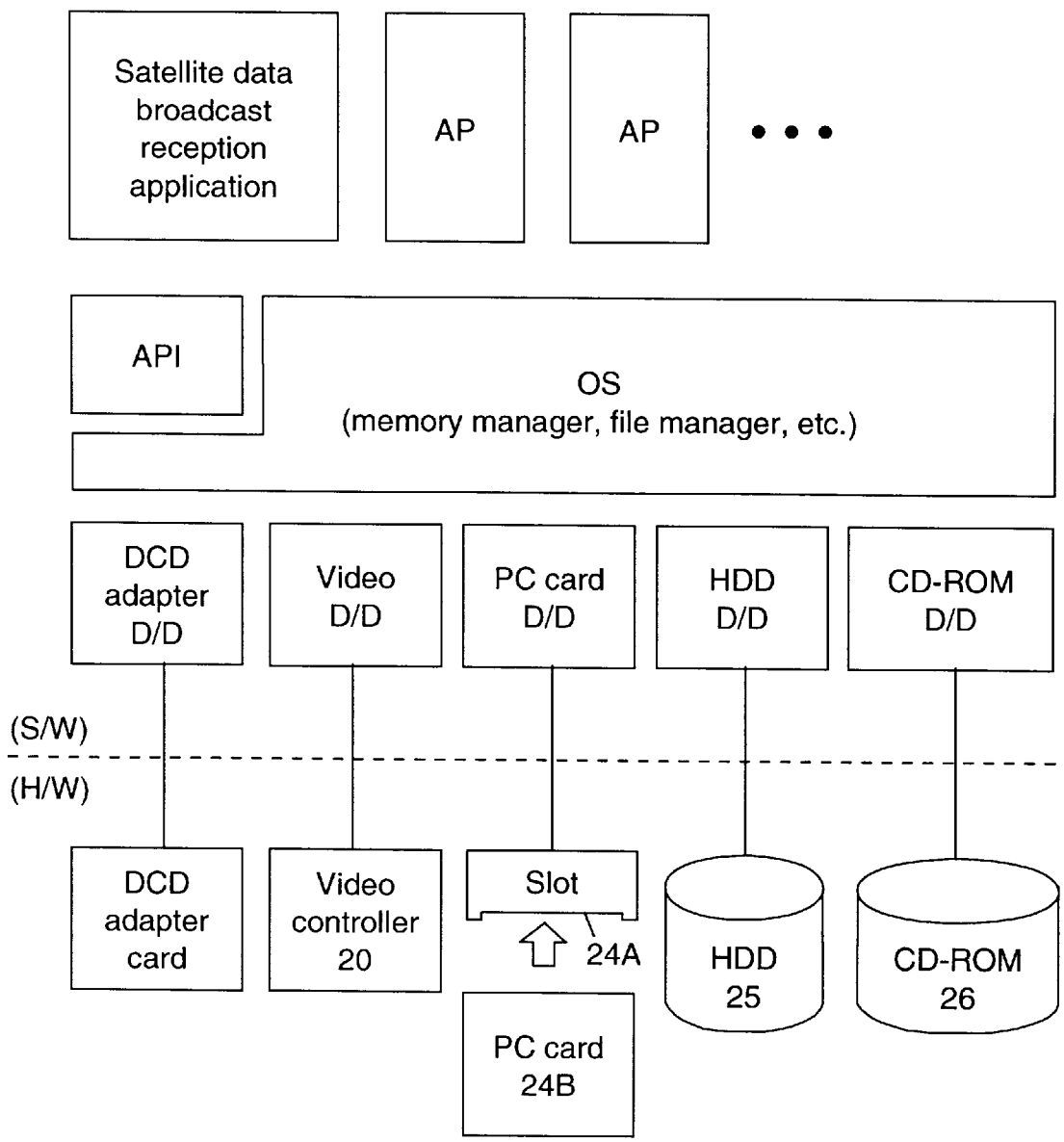
FIG. 5 is a schematic diagram illustrating the hierarchial structure of the software that can be executed by the PC 100 according to the present invention.

FIG. 5 is a specific diagram illustrating the hierarchial structure of software that can be executed by the PC 100 of the present invention.

The software components at the lowest level are device drivers (D/D). The device drivers are programs for converting a command having a common form issued by upper level software (e.g., an operating system) into a form appropriate for the operation of hardware inherent to each device. As is shown in FIG. 5, a dedicated device driver is prepared for each peripheral device, and is installed in the system as needed. A user who uses a DCD adapter card, for example, may install a DCD adapter device driver, while a user who uses the CD-ROM drive 26 may install a CD-ROM device driver.

Sometimes, device drivers are provided at a plurality of layers for a single device. A PC card device driver, for example, actually includes a dedicated device driver unique to each PC card, and a socket service and a card service. A DCD adapter device driver includes up to the third of seven protocol levels for the fetching of a received packet as computer data.

An operating system is basic software for the total management of the hardware and software components of a computer system 100, and is, for example, OS/2 from IBM Corp. or Windows 95 from Microsoft Corp.

In the OS there are a number of sub-systems: a "file manager" for managing a file access of an external storage device, such as an HDD 25; a "memory manager" for managing memory space; a "scheduler" for managing the order and the priority for the execution of tasks; and a "resource manager" for managing the allocation of system resources. The memory manager manages the data to be swapped in to, or swapped out of a physical memory. The file manager writes swap data to the HDD 25 and reads swap data therefrom.

The OS also includes application programming interfaces (APIs). API is a set of functions that are called when an application program employs the basic functions of the OS, such as reading and writing of files relative to the HDD 25, the display of data on the display 22, and the checking of the disk condition. A request for the API is executed by the sub-systems providing the API functions.

The software at the highest level are application programs that are used for practical purposes. The application programs are, for example, word processing software, database software, table calculation software, and communication software. A "satellite data broadcast reception application," which serves as a user interface for reception of satellite data broadcasting, is also another example application program.

The conditions of the application programs are managed by the OS. The application programs can use the OS functions (e.g., file access of the HDD 25) via the API in the OS. A processing sequence, such as the receipt of data from the DCD adapter card, is performed by an API sub-system for satellite data broadcast reception (hereinafter referred to as a "reception API sub-system").

Figure 6:
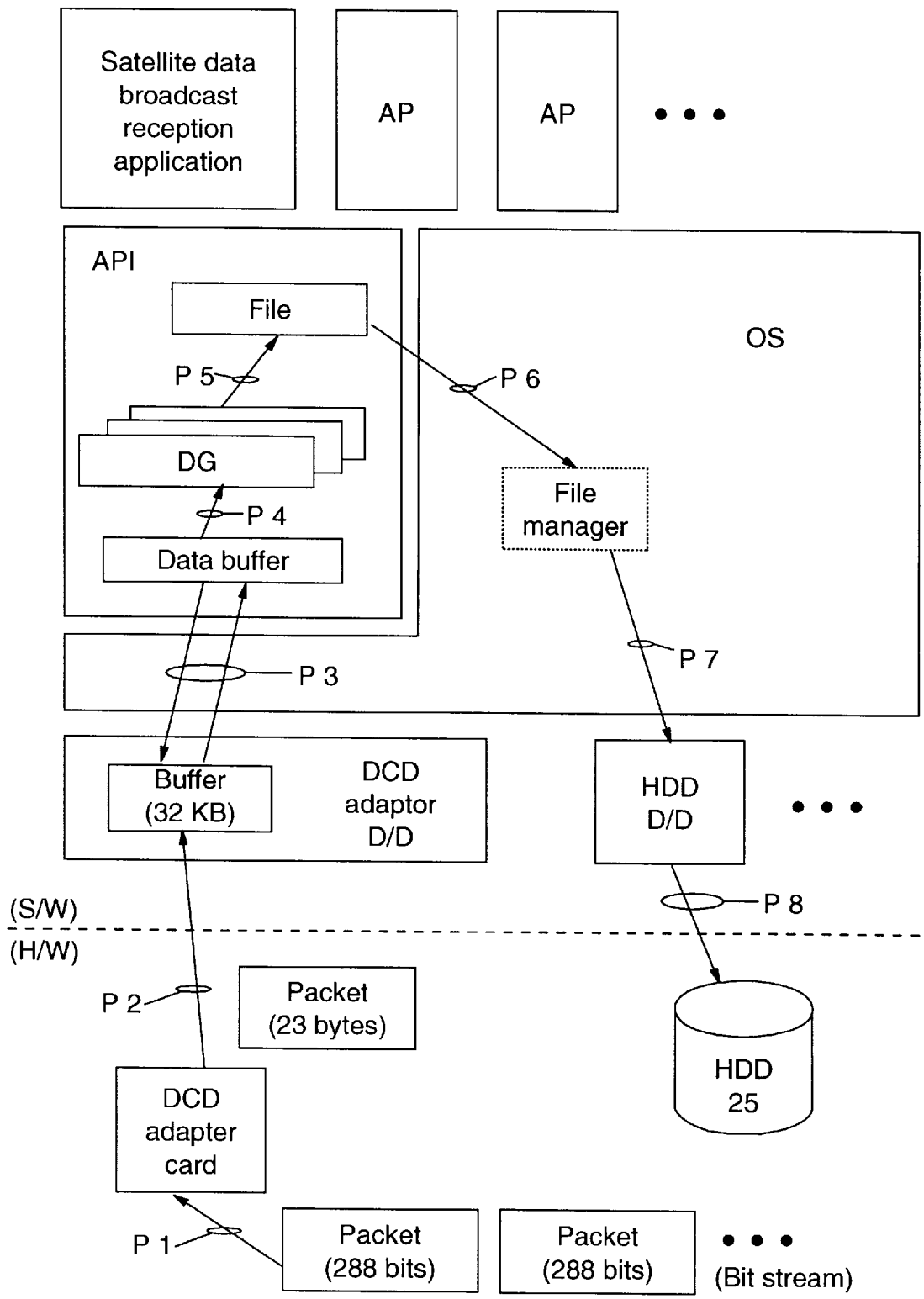
FIG. 6 is a schematic diagram illustrating the processing at the software level of data received by a DCD adapter card.

Processing at the software level for data received through the DCD adapter card will be schematically explained while referring to FIG. 6.

Satellite data is sent in the form of a packet having a 23 byte length (actually, a 288 bit length, including a check bit). The DCD adapter sequentially receives these packets, and performs decoding and error correction for the packets (arrow P1). The processed data is temporarily written in a buffer area for a DCD adapter device driver (arrow P2). The buffer area is, actually, a work area in the main memory 14 assigned to the DCD adapter device driver.

In response to a call from the satellite data broadcast reception application, the API reads the packet data from the buffer area of the device driver two to five times per second as units of 32K each (arrow P3) and writes them in its own data buffer. The data buffer also is actually a work area in the main memory 14 assigned to the API. The API reads packet data from the data buffer and forms data groups (DG) (arrow P4), and saves each data group as a file on the HDD 25 (arrows P5, P6, P7 and P8).

Although generally, the writing and reading relative to the data buffer are almost always performed synchronously by the API, these operations will sometimes be performed asynchronously. It is preferable, therefore, that the data buffer have a ring buffer arrangement to cope with asynchronous operations.

Data buffering and file saving of received packets may be performed directly by the satellite data broadcast reception application, instead of the API.

The hardware and software arrangements of the computer system 100 according to the present invention have been described above. Next, the operation of the present invention will be described by referring to a data buffering operation performed by the system 100 upon the receipt of satellite data.

Figures 7, 7A:
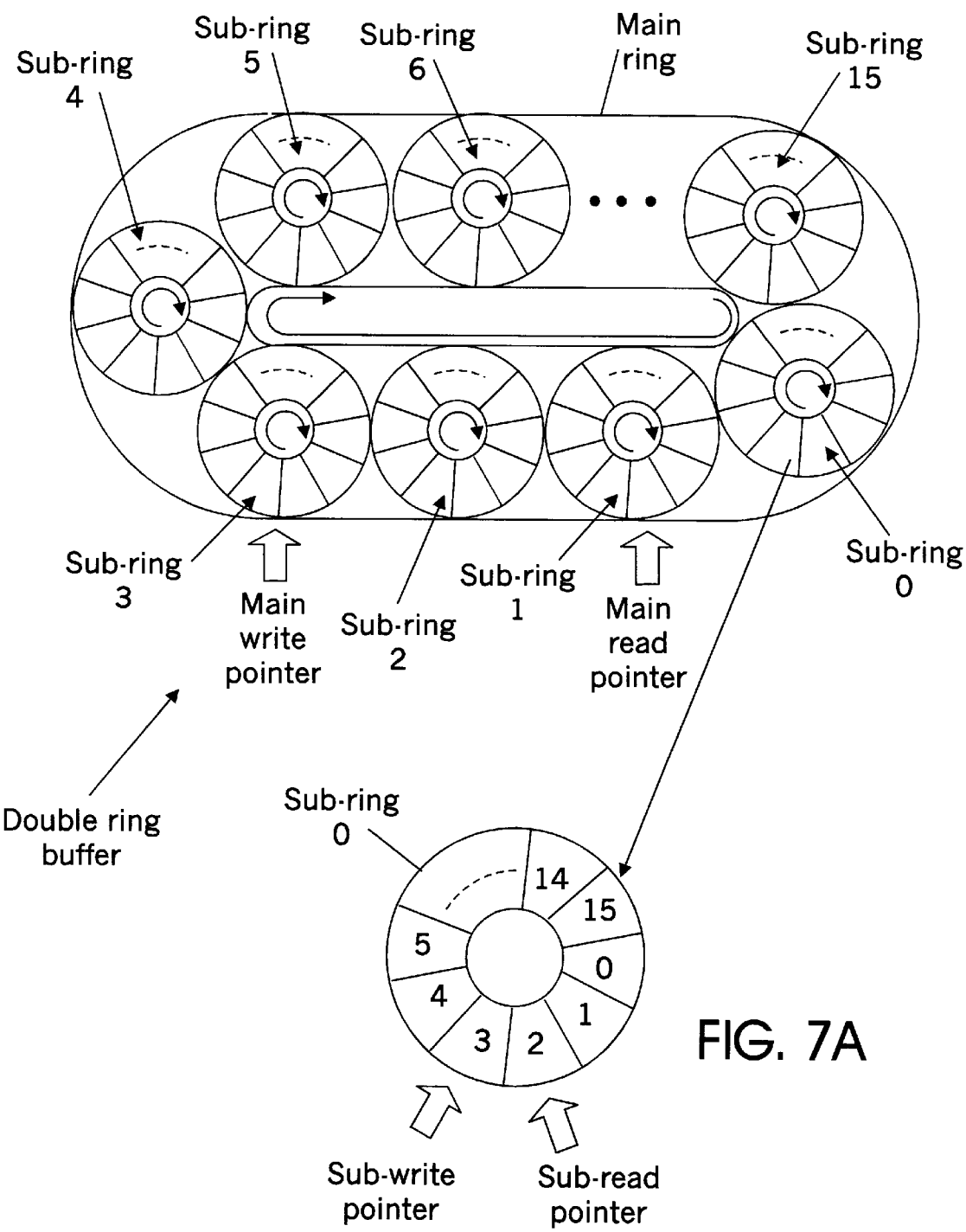
FIG. 7 is a schematic diagram illustrating the arrangement of a data buffer that the API employs.

In FIG. 7 is shown a specific data buffer arrangement that is employed by the API in this embodiment. As previously described, the data buffer employs a ring buffer arrangement to absorb the difference between the speeds at which the writing to the buffer and the reading from the buffer are performed.

As is shown in FIG. 7, the data buffer includes "sub-rings," each of which is formed of a ring of buffer memories constituting the minimum units of a buffer ring, and a "main ring" formed of a ring of the sub-rings. In other words, the data buffers form a double ring (hereinafter referred to as a "double ring buffer").

The ring buffer is realized by controlling buffer memories using a pointer and by coupling the head buffer and the end buffer to form a ring. In this embodiment, a pair of pointers comprising a main write pointer and a main read pointer are provided on the main ring. The main write pointer indicates a sub-ring for which data writing is currently executed, and the main read pointer indicates a sub-ring for which data reading is currently executed. A pair of pointers comprising a sub-write pointer and a sub-read pointer are also provided on each sub-ring. The sub-write pointer indicates a buffer memory for which data writing is currently executed, and the sub-read pointer indicates a buffer memory for which data reading is currently executed.

In consideration of the fact that the API fetches data as 32K units, the size of each buffer memory shall be 32K. The total size of the double ring buffer should be large enough to accommodate received data when the data reading is delayed. It takes about one minute to save to a hard disk a file the size of the largest data group (16M) that is permitted by the communication protocols. During a disk access, the grouping of data is disabled, and the reading data from the buffer is accordingly delayed. Therefore, since the amount of data to be sent in one minute is approximately 8M ($\approx$32K× 256), the double ring buffer should include 256 buffer memories of 32K each. In this embodiment, one sub-ring consists of 16 buffer memories and the main ring consists of 16 sub-rings, thereby providing 256 buffer memories (=16× 16).

In FIG. 7, main ring numbers 0 to 15 are provided on sub-rings in the double ring buffer. The main write pointer and the main read pointer indicate sub-rings having ring numbers of "3" and "1", respectively. In each sub-ring, sub-ring numbers 0 through 15 are provided on the respective buffer memories. In the sub-ring having the main ring number "0", the sub-write pointer and the sub-read pointer indicate buffer memories having sub-ring numbers of "3" and "2", respectively. In other words, each buffer memory can be addressed by referring to its main ring number and its sub-ring number.

As was previously described, the size of the entire double buffer is 8M. Taking the total memory capacity into account, it is apparent that all of the buffer memories can not be resident in the main memory 14. Therefore, almost all the buffer memories in the double buffer are to be swapped out to the hard disk. On the other hand, as a sub-ring is 512K (=32K×16), all of the buffer memories in a single sub-ring can be resident in the main memory 14.

So long as the writing operation and reading operation relative to the data buffer are synchronously performed, the distance between the write pointer and the read pointer, both of which are currently accessed, is adequately short, and both pointers can be placed in a single sub-ring. When the writing operation and the reading operation are being performed synchronously, swapping of the buffer memories can be avoided by repeatedly employing the buffer memories in one sub-ring.

When the writing operation and reading operation begin to be performed asynchronously, the distance between the current write pointer and the current read pointer is extended and both pointers can not be resident in the same sub-ring. For the asynchronous performance of the writing operation and reading operation, more than one sub-ring must be used for data buffering. Although, as a result, the swapping of the buffer memories is induced, this is inevitable in order to avoid the loss of data received during the data processing.

It should be noted that the asynchronous performance of the writing operation and the reading operation relative to the data buffer occupies only a limited period during the system operation (because it is rare for a received data group to have the maximum size (16M)). With the above described double ring buffer arrangement, only one sub-ring is employed so long as the writing operation and the reading operation are synchronously performed, so that the need for swapping can be reduced as much as possible. In other words, normalization of swapping can be avoided for a huge ring buffer.

In this embodiment, several unique variables are defined for the employment of a double ring buffer. These variables will now be explained. MAX_MAIN . . .

The number of sub-rings included in a main ring. MAX_MAIN=16 in FIG. 7. MAX_SUB . . .

The number of buffer memories included in a sub-ring. MAX_SUB=16 in FIG. 7. RP_MAIN . . .

A read pointer (main read pointer) on a main ring, which indicates which sub-ring is currently being used for reading. The read pointer has a value of 0 to MAX_MAIN-1, and its initial value is 0. RP_MAIN=1 in FIG. 7. WP_MAIN . . .

A write pointer (main write pointer) on a main ring, which indicates which sub-ring is currently being used for writing. The write pointer has a value of 0 to MAX_MAIN-1, and its initial value is 0. WP_MAIN=3 in FIG. 7. RP_SUB[i] . . .

A read pointer (sub-read pointer) on the 1-th sub-ring, which indicates which buffer memory in the sub-ring is being used for reading. The variable I has a value of 0 to MAX_MAIN-1. RP_SUB[i] has a value of 0 to MAX_SUB-1, and its initial value is 0. RP_SUB[0]=2 in FIG. 7. WP_SUB[i] . . .

A write pointer (sub-write pointer) on the 1-th sub-ring, which indicates which buffer memory in the sub-ring is being used for writing. The variable I has a value of 0 to MAX_MAIN-1. WP_SUB[i] has a value of 0 to MAX_SUB-1, and its initial value is 0. WP_SUB[0]=3 in FIG. 7.

Figure 8:
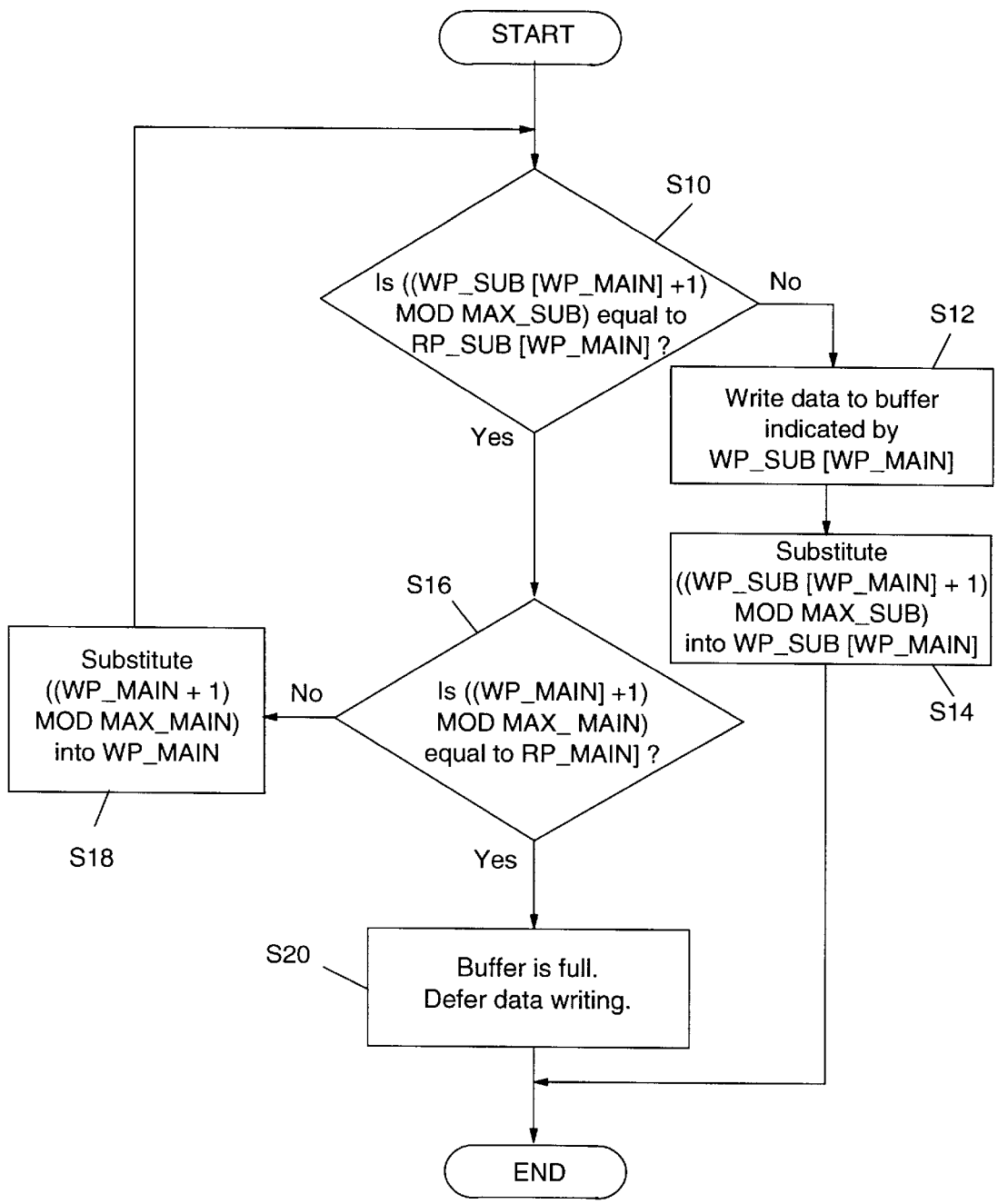
FIG. 8 is a flowchart for a data writing operation relative to a double ring buffer.

Data is written to the double ring buffer while, for example, the reception API sub-system acquires received data from the DCD adapter device driver two to five times per second. FIG. 8 is a flowchart for the writing of data to the double ring buffer. First, at step S10, focusing on a sub-ring that is currently being used for writing, a check is performed to determine whether or not the sub-write pointer in the sub-ring indicates a buffer memory immediately before the one indicated by the sub-read pointer. The decision block can be described using the previous variables by a pseudo program code "((WP_SUB[WP_MAIN]+1) MOD MAX_SUB)=RP_SUB[WP_MAIN]?". (Where x MOD y indicates a remainder of x when division is performed by y. The same is applied hereinafter.)

A negative result at decision block S10 means that a buffer memory available for writing still remains in the sub-ring. Thus, data is written in a buffer memory indicated by the sub-write pointer (step S12). The sub-write pointer advances to the next buffer memory in the sub-ring (step S14), and the data writing process is thereafter terminated. The process at step S14 can be described using the above variables by a pseudo program code "WP_SUB[WP_MAIN]←((WP_SUB[WP_MAIN]+1) MOD MAX_SUB)". (A←B means substituting B into A. The same is applied hereinafter.)

A positive result at decision block S10 means that the sub-write pointer leads the sub-read pointer by one cycle, and the sub-ring is already full. Then, a check is performed to determine whether or not a buffer memory for writing still remains in the next sub-ring in the main ring. At this time, first, a check is performed to determine whether or not the next sub-ring is equal to the sub-ring currently being used for reading (step S16). The process at step S16 can be described using the above variables by a pseudo program code "((WP_MAIN+1) MOD MAX_MAIN)=RP_MAIN?".

A positive result at decision block S16 means that the main write pointer leads the main read pointer by one cycle, and the double ring buffer is already full. In this case, there are no buffer memories available for use for writing, and new data writing is abandoned (step S20). As a result, data received from the satellite may be lost. It should be noted, however, that it is an exceptional and rare occurrence when a double ring buffer of the abundant size shown in FIG. 7 is full (i.e., falls into the condition described at step S20).

When the result at decision block 516 is negative, it is assumed that there is a sub-ring available for writing, and the main write pointer advances to the sub-ring in the main ring (step S18). Program control then returns to step S10 and the above described process is repeated. The process at step S18 can be described using the above variables by a pseudo program code "WP_MAIN←((WP_MAIN+1) MOD MAX_MAIN)".

Figure 9:
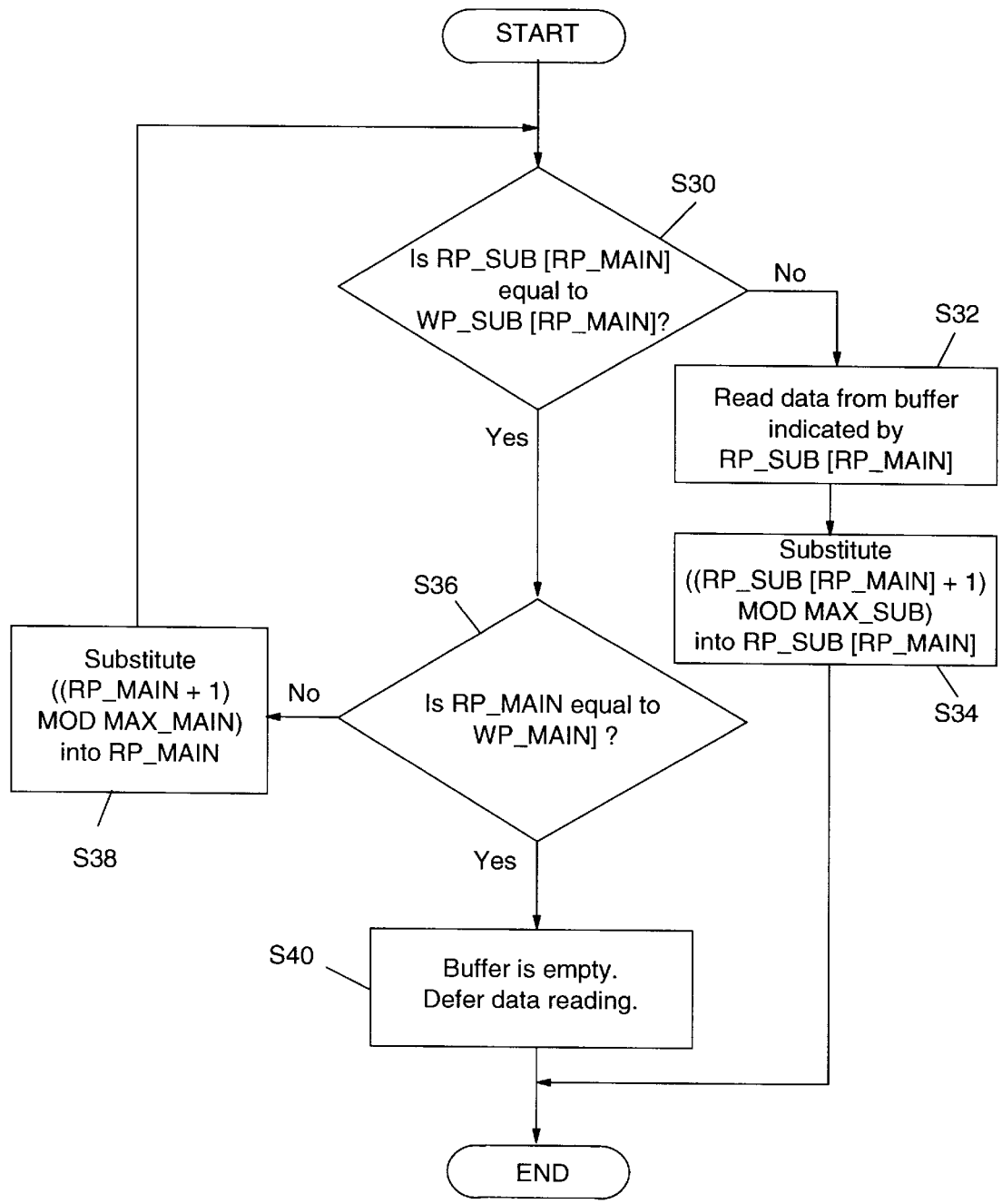
FIG. 9 is a flowchart for a data reading operation relative to a double ring buffer.

Data is read from the double ring buffer when, for example, grouping of the received data that has accumulated in the double ring buffer is performed by the API. FIG. 9 is a flowchart for the reading of data from the double ring buffer. First, at step S30, focusing on a sub-ring currently being used for reading, a check is performed to determine whether or not the sub-read pointer in the sub-ring indicates the same buffer memory as the sub-write pointer. The decision block can be described using the previous variables by a pseudo program code "RP_SUB[RP_MAIN]=WP_SUB[RP_MAIN]?←".

A negative result at decision block S30 means that a buffer memory available for reading still remains in the sub-ring. Thus, data is read from a buffer memory indicated by the sub-read pointer (step S32). The sub-read pointer advances to the next buffer memory in the sub-ring (step S34), and the data reading process is thereafter terminated. The process at step S34 can be described using the above variables by a pseudo program code "RP_SUB[RP_MAIN]←((RP_SUB[RP_MAIN]+1) MOD MAX_SUB)".

A positive result at decision block S30 means that the sub-read pointer has caught up with the sub-write pointer, and the sub-ring is empty. Then, a check is performed to determine whether or not a buffer memory for which reading still remains in the next sub-ring in the main ring. At this time, first, a check is performed to determine whether or not the sub-ring currently being used for reading is equal to the one currently being used for writing (step S36). The process at step S36 can be described using the above variables by a pseudo program code "RP_MAIN=WP_MAIN?".

A positive result at decision block S36 means that the main read pointer has caught up with the main write pointer, and the double ring buffer is empty. In this case, there are no buffer memories available for reading, and data reading is postponed (step S40).

When the result at decision block S36 is negative, it is assumed that there is a sub-ring available for reading, and the main read pointer advances to the sub-ring in the main ring (step S38). Program control then returns to step S30 and the above described process is repeated. The process at step S38 can be described using the above variables by a pseudo program code "RP_MAIN←((RP_MAIN+1) MOD MAX_MAIN)".

The present invention has been described in detail while referring to a specific embodiment. However, it should be obvious to one having ordinary skill in the art that various modifications or revisions of the embodiment are possible within the scope of the present invention. In this specification, an explanation has been given for a case where a personal computer is used for satellite data reception. The present invention can be applied to a case where a personal computer is used for other data processing, or for various information processing apparatuses, such as facsimile machines, copy machines, printers, broadcasting receivers, and word processors, that have the opportunity to temporarily hold an enormous amount of data. That is, although the present invention has been disclosed by using an example, it should not be limited to that example. To fully understand the subject of the present invention, the claims should be referred to.

As is described above in detail, according to the present invention, provided is a data buffering system to temporarily keep data received by a computer system from external sources before the computer system saves the received data as a file.

In addition, according to the present invention, provided is a data buffering system that is employed for temporarily keeping received data, and that provides for buffer memories to be formed into a ring buffer in order to absorb a gap between a data writing speed and a data reading speed.

Further, according to the present invention, provided is a data buffering system that has a ring buffer structure for temporarily keeping an enormous amount of received data, and that can resolve the problem of the swapping of data to a hard disk accompanied by a large increase in the size of a ring buffer.

What is claimed is:

1. A computer system for buffering data by using physical memory of said computer system, comprising:

(a) a plurality of buffer memories provided on a memory space;

(b) a plurality of first ring buffers, each of first ring buffers being constituted by a plurality of said buffer memories connected in a ring, each of said plurality of ring buffers being of a size that can be resident in said physical memory;

(c) a second ring buffer being constituted by a plurality of the first ring buffers connected in a ring;

(d) a first read pointer for indicating a buffer memory to be read next, every first ring buffer being provided with one first read pointer;

(e) a first write pointer for indicating a buffer memory to be written next, every first ring buffer being provided with one first write pointer;

(f) a second read pointer for indicating a first ring buffer where data read operation from a buffer memory is currently executed;

(g) a second write pointer for indicating a first ring buffer where data write operation to a buffer memory is currently executed;

such that when a read operation from a buffer memory and a write operation to a buffer memory are performed:

(1) synchronously, the second read pointer and the second write pointer point to only one of said plurality of first ring buffers;

(2) asynchronously, the second read pointer points to one of said plurality of first ring buffers and the second write pointer points to a different one of said plurality of first ring buffers;

(h) an external storage device attached to said computer system; and (i) swapping means for swapping contents of said buffer memories between said physical memory and said external storage device only when said read operation from a buffer memory and said write operation to a buffer memory are performed asynchronously.

2. The computer system according to claim 1, further comprising:

(h) write control means for determining, at a first ring buffer currently designated by the second write pointer, whether or not the first write pointer indicates a buffer memory immediately before the buffer memory indicated by the first read pointer, for, when the first write pointer does not indicate immediately before the buffer memory indicated by the first read pointer, writing data to the buffer memory and advancing the first write pointer to a successive buffer memory, and for, when the first write pointer indicates immediately before the buffer memory indicated by the first read pointer, advancing the second write pointer to an immediately following first ring buffer.

3. The computer system according to claim 2, wherein, before said second write pointer advances to the next first ring buffer, said write control means determines whether or not said second write pointer indicates a first ring buffer immediately before the one indicated by said second read pointer, and wherein, when the second write pointer indicates the first ring buffer immediately before the one indicated by said second read pointer, said write control means ascertains that the first ring buffer is full, and does not advance the second write pointer and suspends the data writing operation.

4. The computer system according to claim 1, further comprising:

(h) read control means for determining, at a first ring buffer currently designated by said second read pointer, whether or not the first read pointer indicates the buffer memory indicated by the first write pointer, for, when the first read pointer does not indicate the buffer memory indicated by the first write pointer, reading data from the buffer memory, and for, when the first read pointer indicates the buffer memory indicated by the first write pointer, advancing said second read pointer to an immediately following first ring buffer.

5. The computer system according to claim 4, wherein, before said second read pointer advances to the next first ring buffer, said read control means determines whether or not said second read pointer indicates the first ring buffer indicated by said second write pointer, and wherein, when said second read pointer indicates the one indicated by said second write pointer, said read control means ascertains that the first ring buffer is empty, and does not advance said second read pointer and suspends said data reading operation.

6. The computer system according to claim 1, wherein said data is received from an external source.

7. A computer system for temporarily buffering data received from an external source before said computer system saves the received data as a file, comprising:
(a) a plurality of buffer memories provided on a memory space;
(b) a plurality of first ring buffers, each of first ring buffers being constituted by a plurality of said buffer memories connected in a ring each of said plurality of ring buffers being of a size that can be resident in said physical memory;
(c) a second ring buffer being constituted by a plurality of said first ring buffers connected in a ring;
(d) a first read pointer for indicating a buffer memory to be read next, every first ring buffer being provided with one first read pointer;
(e) a first write pointer for indicating a buffer memory to be written next, every first ring buffer being provided with one first write pointer;
(f) a second read pointer for indicating a first ring buffer where data read operation from a buffer memory is currently executed;
(g) a second write pointer for indicating a first ring buffer where data write operation to a buffer memory is currently executed;
such that when a read operation from a buffer memory and a write operation to a buffer memory are performed:
(1) synchronously, the second read pointer and the second write pointer point to only one of said plurality of first ring buffers;
(2) asynchronously, the second read pointer points to one of said plurality of first ring buffers and the main write pointer points to a different one of said plurality of first ring buffers;
(h) data writing means for writing the received data in a buffer memory, which is indicated by a first write pointer, in a first ring buffer currently indicated by said second write pointer;
(i) file preparation means for reading data from a buffer memory, which is indicated by a first read pointer, in a first ring buffer currently indicated by said second read pointer, and for preparing a file for said data;
(j) an external storage device attached to said computer system; and
(k) swapping means for swapping contents of said buffer memories between said physical memory and said external storage device only when said read operation from a buffer memory and said write operation to a buffer memory are performed asynchronously.

8. The data buffering system according to claim 7, wherein said data write means determines, at a first ring buffer currently designated by said second write pointer, whether or not the first write pointer indicates a buffer memory immediately before the one indicated by the first read pointer, wherein, when the first write pointer does not indicate the buffer memory immediately before the one indicated by the first read pointer, said data write means writes data to the buffer memory and advances the first write pointer to a successive buffer memory, and wherein, when the first write pointer indicates the buffer memory immediately before the one indicated by the first read pointer, said data write means advances said second write pointer to an immediately following first ring buffer.

9. The data buffering system according to claim 8, wherein, before said second write pointer advances to said next first ring buffer, said write control means determines whether or not said second write pointer indicates a first ring buffer memory immediately before the one indicated by said second read pointer, wherein, when said second write pointer indicates the first ring buffer immediately before the one indicated by said second read pointer, said write control means ascertains that the first ring buffer is full, and does not advance said second write pointer and suspends said data writing operation.

10. The data buffering system according to claim 7, wherein said file preparation means determines, at a first ring buffer currently designated by said second read pointer, whether or not the first read pointer indicates a buffer memory indicated by the first write pointer, wherein, when the first read pointer does not indicate the buffer memory indicated by the first write pointer, said file preparation means reads data from the buffer memory, and wherein, when the first read pointer indicates the buffer memory indicated by the first write pointer, said file preparation means advances said second read pointer to an immediately following first ring buffer.

11. The data buffering system according to claim 10, wherein, before said second read pointer advances to the next first ring buffer, said file preparation means determines whether or not said second read pointer indicates a first ring buffer indicated by said second write pointer, and wherein, when said second read pointer indicates the first ring buffer indicated by said second write pointer, said file preparation means ascertains that the first ring buffer is empty, and does not advance said second read pointer and suspends said data reading operation.

12. A computer system for temporarily buffering data received from an external source before said computer system saves the received data as a file, comprising:
(a) a plurality of buffer memories provided on a memory space;
(b) a plurality of first ring buffers, each of first ring buffers being constituted by a plurality of said buffer memories connected in a ring, each of said plurality of ring buffers being of a size that can be resident in said physical memory;
(c) a second ring buffer being constituted by a plurality of said first ring buffers connected in a ring;
(d) a first read pointer for indicating a buffer memory to be read next, every first ring buffer being provided with one first read pointer;
(e) a first write pointer for indicating a buffer memory to be written next, every first ring buffer being provided with one first write pointer;
(f) a second read pointer for indicating a first ring buffer where data read operation from a buffer memory is currently executed;

(g) a second write pointer for indicating a first ring buffer where data write operation to a buffer memory is currently executed; such that when a read operation from a buffer memory and a write operation to a buffer memory are performed:
  (1) synchronously, the second read pointer and the second write pointer point to only one of said plurality of first ring buffers;
  (2) asynchronously, the second read pointer points to one of said plurality of first ring buffers and the second write pointer points to a different one of said plurality of first ring buffers;
(h) an external storage device attached to said computer system;
(i) data writing means for writing the received data in a buffer memory, which is indicated by a first write pointer, in a first ring buffer currently indicated by said second write pointer;
(j) file preparation means for reading data from a buffer memory, which is indicated by a first read pointer, in a first ring buffer currently indicated by said second read pointer, and for preparing a file for the received data and saving the file in said external storage device; and
(k) swapping means for swapping contents of said buffer memories between said physical memory and said external storage device only when said read operation from a buffer memory and said write operation to a buffer memory are performed asynchronously.

13. The data buffering system according to claim 12, wherein said data write means determines, at a first ring buffer currently designated by said second write pointer, whether or not the first write pointer indicates a buffer memory immediately before the one indicated by the first read pointer, wherein, when the first write pointer does not indicate the buffer memory immediately before the one indicated by the first read pointer, said data write means writes data to the buffer memory and advances the first write pointer to a successive buffer memory, and wherein, when the first write pointer indicates the buffer memory immediately before the one indicated by the first read pointer, said data write means advances said second write pointer to an immediately following first ring buffer.

14. The data buffering system according to claim 13, wherein, before said second write pointer advances to said next first ring buffer, said write control means determines whether or not said second write pointer indicates a first ring buffer memory immediately before the one indicated by said second read pointer, wherein, when said second write pointer indicates the first ring buffer immediately before the one indicated by said second read pointer, said write control means ascertains that the first ring buffer is full, and does not advance said second write pointer and suspends said data writing operation.

15. The data buffering system according to claim 12, wherein said file preparation means determines, at a first ring buffer currently designated by said second read pointer, whether or not the first read pointer indicates a buffer memory indicated by the first write pointer, wherein, when the first read pointer does not indicate the buffer memory indicated by the first write pointer, said file preparation means reads data from the buffer memory, and wherein, when the first read pointer indicates the buffer memory indicated by the first write pointer, said file preparation means advances said second read pointer to an immediately following first ring buffer.

16. The data buffering system according to claim 15, wherein, before said second read pointer advances to the next first ring buffer, said file preparation means determines whether or not said second read pointer indicates a first ring buffer indicated by said second write pointer, and wherein, when said second read pointer indicates the first ring buffer indicated by said second write pointer, said file preparation means ascertains that the first ring buffer is empty, and does not advance said second read pointer and suspends said data reading operation.

* * * * *